United States Patent [19]

Sogabe et al.

[11] Patent Number: 4,906,838
[45] Date of Patent: Mar. 6, 1990

[54] OPTICAL ENCODER WITH GROUNDED CODING PLATE

[75] Inventors: Masatoyo Sogabe; Kanemasa Okuda; Tomonaga Yamamoto, all of Yamanashi, Japan

[73] Assignee: Fanuc Ltd., Minamitsuru, Japan

[21] Appl. No.: 320,093

[22] PCT Filed: Jul. 20, 1988

[86] PCT No.: PCT/JP88/00722

§ 371 Date: Mar. 7, 1989

§ 102(e) Date: Mar. 7, 1989

[87] PCT Pub. No.: WO89/01131

PCT Pub. Date: Feb. 9, 1989

[30] Foreign Application Priority Data

Jul. 28, 1987 [JP] Japan .......................... 62-115197[U]

[51] Int. Cl.$^4$ ............................................. H01J 3/14
[52] U.S. Cl. ............................ 250/231.14; 250/237 G
[58] Field of Search ................... 250/231 SE, 237 G; 341/13

[56] References Cited

U.S. PATENT DOCUMENTS 3,770,971 11/1973 Somerset .................... 250/231 SE
4,072,201 2/1978 Wiesler .................... 250/231 SE Primary Examiner—David C. Nelms
Assistant Examiner—Sherrie Hsia
Attorney, Agent, or Firm—Staas & Halsey

[57] ABSTRACT

A chip-mounting portion of a flexible cable (18) having a light-receiving element chip mounted thereon is placed on a shielding plate (22), and a pattern portion (15b) on a fixed coding plate (15) and the shielding plate (22) are grounded, thereby shielding the periphery of the light-receiving element chip to improve noise tolerability with respect to noise generated internally.

4 Claims, 3 Drawing Sheets

OPTICAL ENCODER WITH GROUNDED CODING PLATE

TECHNICAL FIELD

This invention relates to an optical encoder and, more particularly, to an optical encoder capable of raising the noise tolerability of a light-receiving element.

BACKGROUND ART

An optical encoder has a rotary coding plate secured to a shaft, a fixed coding plate arranged to oppose the rotary coding plate with a predetermined spacing therebetween and secured to a housing, a light source, and a light-receiving element which receives the light from the light source via the rotary coding plate and fixed coding plate, and is adapted so as to be able to detect the rotating direction, rotational speed or rotational angle of the shaft using the output of the light-receiving element produced when the shaft is rotated.

When the noise tolerability of the optical encoder is considered, a case in which the noise source is external and a case in which it is internal must be taken into account.

With regard to noise from an external source, noise tolerability can be enhanced with comparative ease by physically surrounding the encoder in a space of 0[V]. However, enhancing noise tolerability with respect to noise generated internally is considerably more difficult. In particular, since the rotary shaft is a source of noise in the optical encoder, a pattern portion (a portion on which chrome is formed by vapor deposition) on the rotary coding plate secured to the shaft and a pattern portion on the fixed coding plate secured to the housing form secondary noise sources due to electromagnetic induction and, hence, it is difficult to enhance noise tolerability. More specifically, since noise tolerability is proportional to the square of distance from the noise source, it is necessary to keep at a distance from the noise source. In an optical encoder, however, in order to assure an output signal level from the light-receiving element, a small gap of less than 1 mm is required between the light-receiving element and the fixed coding plate, and a very small gap of 70–90 μm is required between the fixed coding plate and the rotary coding plate. For this reason, the distance between the fixed coding plate, which is a source of noise, and the light-receiving element cannot be lengthened. Furthermore, in order to surround (shield) the light-receiving element by 0[V], a dielectric capable of being reduced to 0[V] is required to be inserted between the light-receiving element and the fixed coding plate. However, this also is very difficult to achieve in terms of space.

SUMMARY OF THE INVENTION

Accordingly, an object of the present invention is to provide an optical encoder capable of enhancing noise tolerability with respect to noise generated internally, as from a rotary shaft.

To achieve the above object, chip-mounting portion of a flexible cable having a light-receiving element chip mounted thereon is place on a shielding plate, and a pattern portion on a fixed coding plate and the shielding plate are grounded, thereby shielding the periphery of the light-receiving element chip to improve noise tolerability with respect to noise generated internally.

BEST MODE FOR CARRYING OUT THE INVENTION

Figure 1:
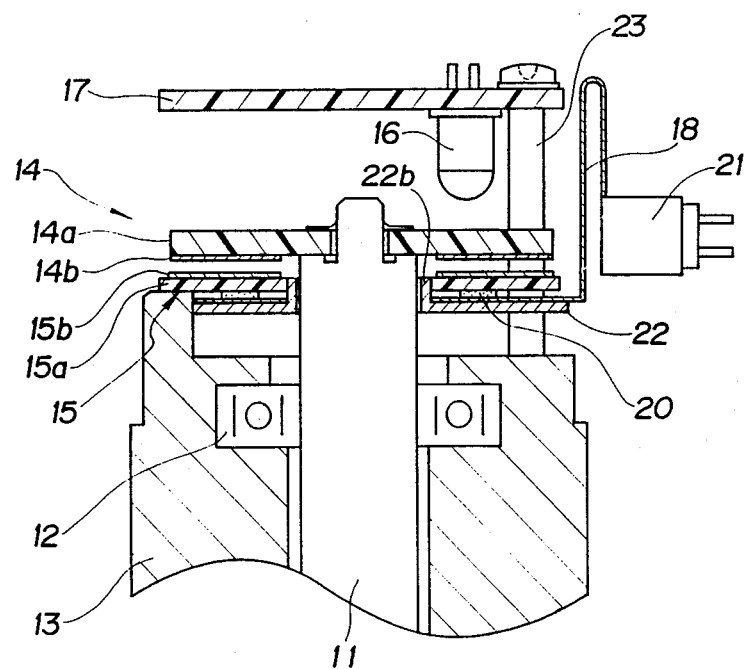
FIG. 1 is a sectional view illustrating the principal portion of an optical encoder according to the present invention.
Figure 2:
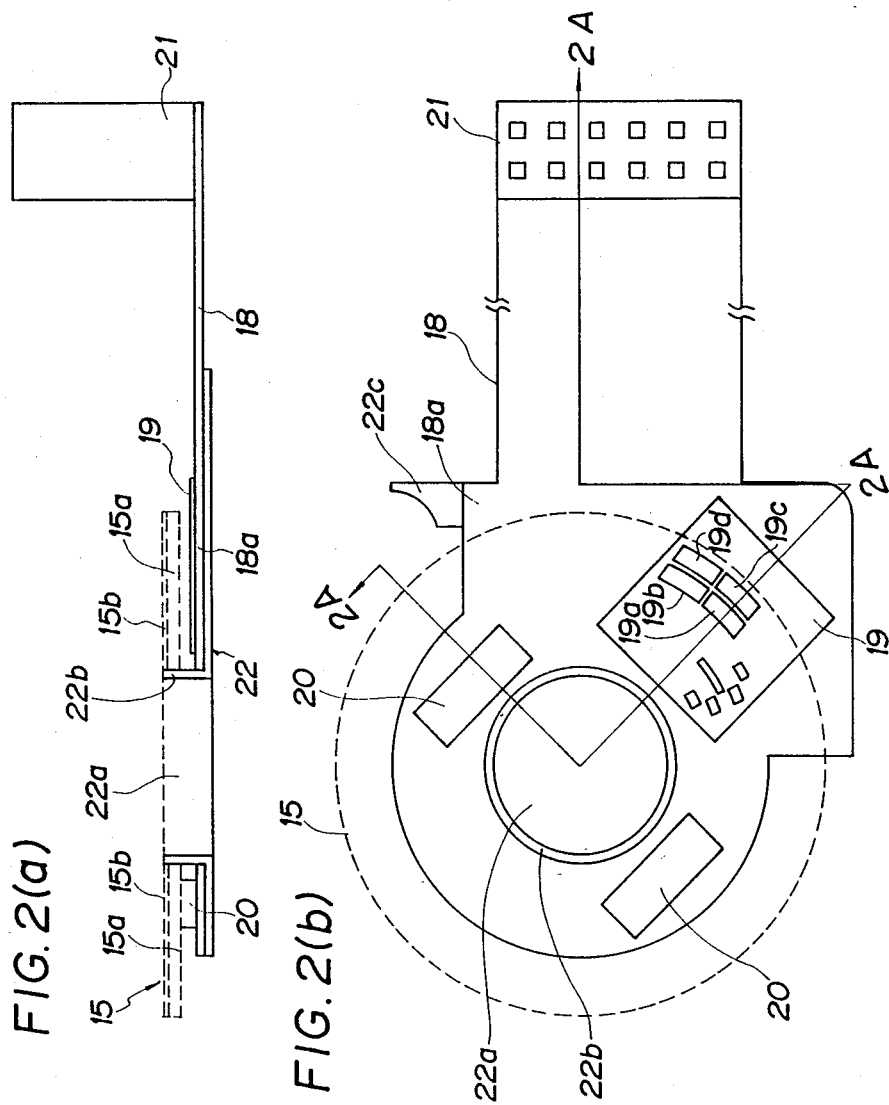
FIGS. 2(a) and 2(b) are views illustrating the mounted state of a light-receiving element chip.
Figure 3:
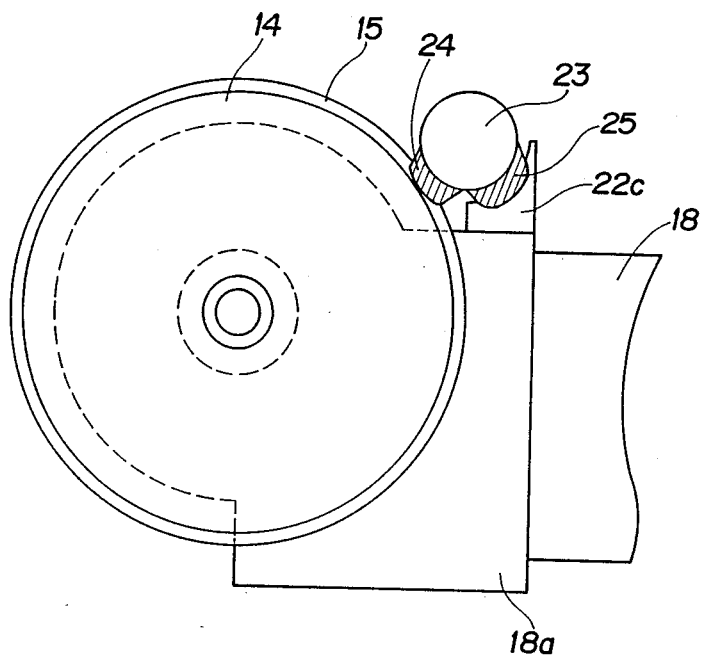
FIG. 3 is a view for illustrating a specific example of a method of grounding a shielding plate and a pattern portion.

FIG. 1 is a sectional view illustrating the principal portion of an optical encoder according to the present invention, FIGS. 2(a) and 2(b) illustrate the mounted state of a light-receiving element chip, and FIG. 3 is a view illustrating a specific example of a method of grounding a shielding plate and a pattern portion. In FIG. 2(a) is a sectional view taken along line A—A of FIG. 2(b). In FIG. 1, the dimensions of the chip and the like are drawn larger than in actuality for the sake of clarity.

With reference to FIG. 1, numeral 11 denotes a shaft, 12 a bearing rotatably supporting the shaft 11, 13 a housing, and 14 a disk-shaped rotary coding plate secured to a distal end of the shaft 11 for rotating in unison therewith and having a transparent glass substrate 14a and a pattern portion 14b formed by vapor deposition of chrome so as to have light-transmissive slits at a predetermined pitch in the circumferential direction. Numeral 15 denotes a disk-shaped fixed coding plate secured to the housing 13 so as to oppose the rotary coding plate 14 across a predetermined gap (70–90 μm) and having a transparent glass substrate 15a and a pattern portion 15b formed by vapor deposition of chrome so as to have slits of an A phase, B phase, etc. It should be noted that the greater part of the pattern portion 15b is formed by vapor deposition of chrome and that only a portion thereof is provided with the slits for the A phase, B phase, etc. Numeral 16 denotes a light source, 17 a printed board on which the light source and its drive circuitry are mounted, and 18 a flexible cable for providing power.

A light-receiving element chip 19 and a spacer 20 are attached to a mounting portion 18a at one end of the flexible cable 18, as shown in FIGS. 2(a) and (b), and a connector 21 is connected to the other end. The light-receiving element chip 19 is formed to include light-receiving elements 19a–19d for A and B phases, and a light-receiving circuit. The portion indicated by the dashed lines 15 in FIGS. 2(a) and (b) is the fixed coding plate.

Returning to FIG. 1, numeral 22 denotes a shielding plate disposed below the mounting portion 18a of flexible cable 18 and having substantially the same shape. The shielding plate 22 has a central hole 22a (see FIG. 2) through which the shaft is passed, a projection 22b formed along the circumference of the hole, and a tab 22c for grounding. Numeral 23 denotes a spacing bolt. As shown in FIG. 3, the spacing bolt 23 and the pattern portion 15b of the fixed coding plate 15, as well as the spacing bolt 23 and the tab 22c of the shielding plate 22, are electrically connected by soldering or an electrically conductive bonding agent (see the shaded portions 24, 25). The pattern portion 15b and the shielding plate 22 can be grounded by making the potential of the spacing bolt 23 0[V]. Thus, since the light-receiving element chip 19 is surrounded by or is between the pattern portion 15b of fixed coding plate 15 and the shiedling plate 22, and since this pattern portion and the shielding plate are grounded, the periphery of the light-receiving element chip 19 can be shielded. As a result, it is possible to enhance noise tolerability with respect to internally generated noise, e.g., power supply noise generated via the shaft 11.

We claim:

1. An optical encoder having a rotary coding plate secured to a shaft for rotating in unison with said shaft, a fixed coding plate arranged to oppose the rotary coding plate with a predetermined spacing therebetween, a light source, and a light-receiving element which receives the light from the light source via the rotary coding plate and fixed coding plate, comprising:
    a shielding plate;
    a light-receiving element chip interposed between said shielding plate and said fixed coding plate;
    a pattern portion formed on said fixed coding plate; and
    means for grounding said pattern portion and said fixed plate.

2. An optical encoder according to claim 1, which includes:
    a housing, said shielding plate being fixed to said housing;
    a cylindrical boss formed centrally on said shielding plate for receiving said shaft therethrough;
    a power cable having a mounting portion attached thereto, said chip being mounted on said mounting portion; and
    wherein said fixed coding plate is secured to said housing a predetermining space above said shielding plate.

3. An optical encoder according to claim 2, which includes a printed board having a light source driving circuit and said light source mounted thereon, and a bolt for securing said printed board to said housing, said bolt further being electrically connected to said pattern portion and said fixed plate to ground said pattern portion and said fixed plate.

4. An optical encoder according to claim 1, wherein said means for grounding said pattern portion and said fixed plate comprises a bolt electrically connected to said pattern portion and said fixed plate.

* * * * *

UNITED STATES PATENT AND TRADEMARK OFFICE
CERTIFICATE OF CORRECTION

PATENT NO. : 4,906,838

DATED : March 6, 1990

INVENTOR(S) : SOGABE MASATOYO et al.

It is certified that error appears in the above-identified patent and that said Letters Patent is hereby corrected as shown below:

Column 2, line 8, delete "for";

line 16, delete "2" (second occurrence);

line 19, delete "In".

Signed and Sealed this

Ninth Day of April, 1991

*Attest:*

HARRY F. MANBECK, JR.

*Attesting Officer*      *Commissioner of Patents and Trademarks*